(12) United States Patent
Ishida (10) Patent No.: US 8,808,818 B2
(45) Date of Patent: Aug. 19, 2014

(54) MOLDED FOAM (71) Applicant: Kyoraku Co., Ltd., Kyoto (JP)

(72) Inventor: Ryuichi Ishida, Tokyo (JP)

(73) Assignee: Kyoraku Co., Ltd., Kyoto (JP)

( * ) Notice: Subject to any disclaimer, the term of this patent is extended or adjusted under 35 U.S.C. 154(b) by 0 days.

(21) Appl. No.: 13/759,180

(22) Filed: Feb. 5, 2013

(65) Prior Publication Data

US 2013/0216747 A1  Aug. 22, 2013

(30) Foreign Application Priority Data

Feb. 16, 2012 (JP) ................. 2012-032101

(51) Int. Cl.
| | |
|---|---|
| B29D 22/00 | (2006.01) |
| B60H 1/00 | (2006.01) |
| F16L 47/06 | (2006.01) |
| B29C 44/56 | (2006.01) |
| B29C 49/04 | (2006.01) |
| F24F 13/02 | (2006.01) |
| B29C 49/60 | (2006.01) |
| B29C 47/36 | (2006.01) |
| B29C 49/00 | (2006.01) |
| B29C 47/00 | (2006.01) |
| B29L 23/00 | (2006.01) |
| B29C 47/54 | (2006.01) |
| F16L 47/00 | (2006.01) |
| B29K 105/04 | (2006.01) |

(52) U.S. Cl.
CPC .......... *B60H 1/00564* (2013.01); *B29C 49/041* (2013.01); *F24F 13/0245* (2013.01); *B29C 2049/609* (2013.01); *B29C 47/368* (2013.01); *B29C 2049/0057* (2013.01); *F16L 47/06* (2013.01); *B29C 47/0021* (2013.01); *B29C 47/0054* (2013.01); *B29C 49/04* (2013.01); *B29L 2023/004* (2013.01); *B29C 49/60* (2013.01); *B29L 2023/22* (2013.01); *B29C 44/56* (2013.01); *B29C 47/54* (2013.01); *F16L 47/005* (2013.01); *F24F 13/0263* (2013.01); *B29K 2105/04* (2013.01)
USPC ............. 428/36.5; 454/69; 138/111; 138/151

(58) Field of Classification Search
CPC .... B60H 1/00564; B29C 49/04; B29C 44/56; B29C 49/60; B29C 2049/0057; F16L 47/005; F16L 47/06; F24F 13/0263; F24F 13/0245
USPC ................. 428/36.5; 138/115, 121, 111, 151; 454/69; 60/323

See application file for complete search history.

(56) References Cited

U.S. PATENT DOCUMENTS 3,251,382 A * 5/1966 Tatsch .......................... 138/151
5,060,697 A  10/1991 Weinheimer (Continued)

FOREIGN PATENT DOCUMENTS

DE  8912822 U1  2/1990
DE  3929051 C1  4/1990

(Continued)

OTHER PUBLICATIONS

Extended European Search Report of the corresponding European Patent Application No. 13155106.1, dated Jun. 4, 2013.

*Primary Examiner* — N. Edwards (74) *Attorney, Agent, or Firm* — Global IP Counselors, LLP (57) ABSTRACT The present invention is a molded foam (foam duct (1)) having a tubular section (100*a*) with an open end (120*a*). A parting line (PL), which is formed during molding, extends to the open end (120*a*). The molded foam includes a protruding portion protruding from the parting line (PL) on one side of the parting line (PL) at least in the proximity of the open end (120*a*).

2 Claims, 8 Drawing Sheets

(56) References Cited

U.S. PATENT DOCUMENTS

| | | | |
|---|---|---|---|
| 6,713,139 B2 * | 3/2004 | Usui et al. | 428/36.5 |
| 8,435,615 B2 * | 5/2013 | Tsuchida et al. | 428/36.5 |
| 2011/0056584 A1 | 3/2011 | Onodera et al. | |
| 2013/0216747 A1 * | 8/2013 | Ishida | 428/36.5 |

FOREIGN PATENT DOCUMENTS

| | | |
|---|---|---|
| DE | 19807411 A1 | 8/1999 |
| JP | 2005-241157 A | 9/2005 |

* cited by examiner

A-A CROSS SECTION

MOLDED FOAM

CROSS-REFERENCE TO RELATED APPLICATIONS

This application claims priority to Japanese Patent Application No. 2012-032101 filed on Feb. 16, 2012, the entirety of which is hereby incorporated by reference in its entirety.

BACKGROUND OF THE INVENTION

1. Field of the Invention

The present invention relates to molded resin foams.

2. Related Art

In the air conditioning system of an automobile or the like, for example, a tubular air conditioning duct for venting air is used. A known example of an air conditioning duct is a molded foam (hereinbelow referred to as "foam duct") for which a resin foam is used consisting of a thermoplastic resin foamed by a foaming agent. Demand in foam ducts has grown because of their strong heat insulating properties and low weight.

A widely known example of a method for manufacturing such a foam duct is blow molding in which a melted resin is clamped in a divided mold and the interior is filled with air and then the air is expanded. With recent improvements in molding techniques, it has become possible to mass-produce foam ducts with increased expansion ratios.

A known example of a technique recently submitted for application by the applicant is a foam duct molded by foam blow molding in which a supercritical fluid is added as a foaming agent, wherein the surface roughness and expansion ratio on the outer surface are within a predetermined range (see Japanese laid-open patent publication No. 2005-241157, for example).

SUMMARY OF THE INVENTION

In order to have the function of channeling air to other members, the foam duct described above is formed by a tubular section which is at least partially tubular and which is open at the end. When a foam duct of this shape is manufactured with blow molding using a conventional divided mold, two parting lines that extend along the tube up to the open end are inevitably formed in the foam duct after molding. The strength of the open end is not a problem when the other member is fixed to the open end; however, breaks and cracks may easily happen at parting lines due to falling impact and the like during transportation of the foam duct, for example.

Consequently, an object of the invention is, in a molded foam with a tubular section having an open end, to restrain breaks and cracks at the open end near the parting lines formed during molding of the molded foam.

To solve the problems described above, the present invention is a molded foam having a tubular section with an open end, wherein a parting line formed during molding extends to the open end. The molded foam includes a protruding portion protruding from the parting line on one side of the parting line at least in the proximity of the open end.

BRIEF DESCRIPTION OF DRAWINGS

Referring now to the attached drawings which form a part of this original disclosure.

DETAILED DESCRIPTION OF THE EMBODIMENTS

An embodiment of the foam duct according to the present invention is described in detail with reference to the accompanied drawings.

<Structural Example of Foam Duct 1>

Figure 1:
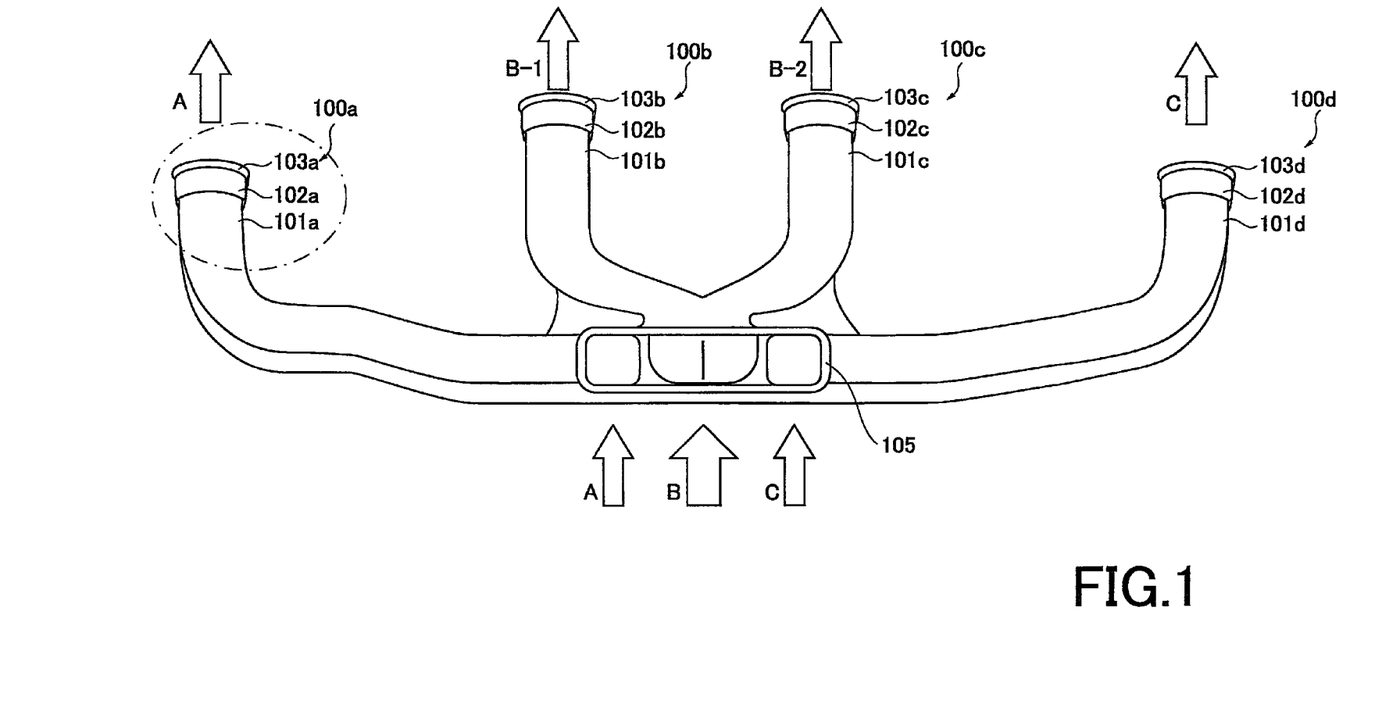
FIG. 1 is a plan view of a foam duct of the embodiment.
Figure 2:
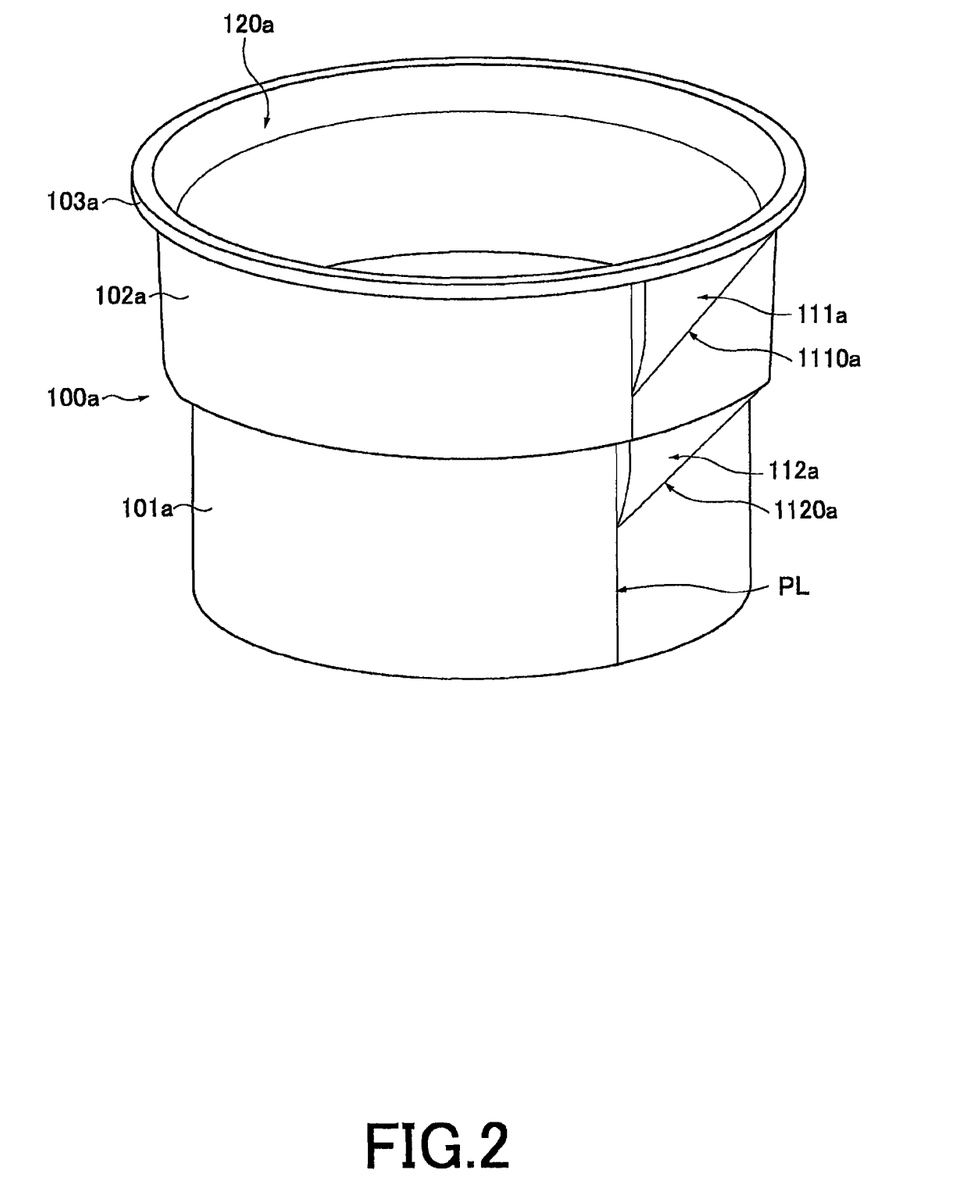
FIG. 2 is a partial perspective view of the tubular section of the foam duct of the embodiment.
Figure 3:
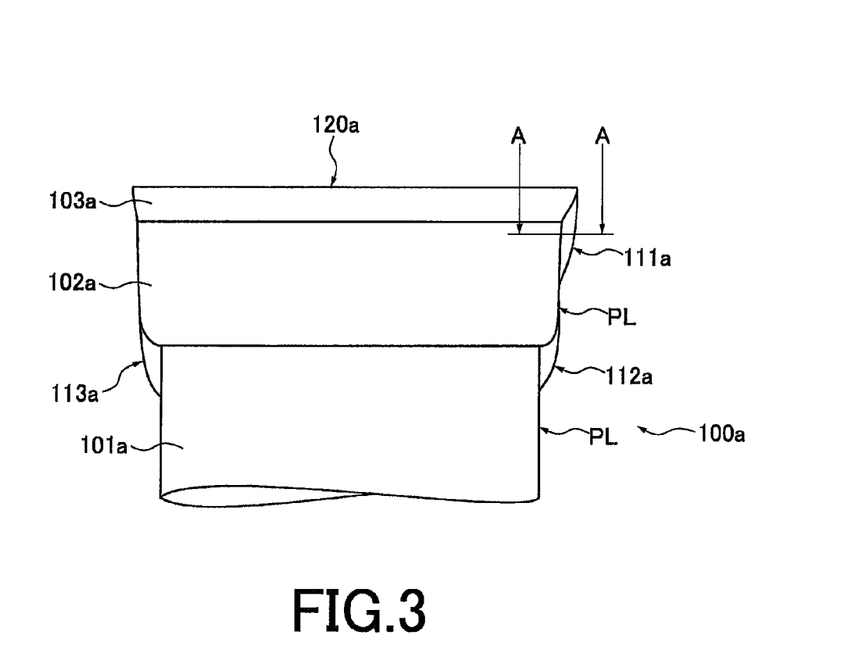
FIG. 3 is a drawing of the tubular section of the foam duct of the embodiment as seen in a direction parallel to the open end surface.
Figure 4:
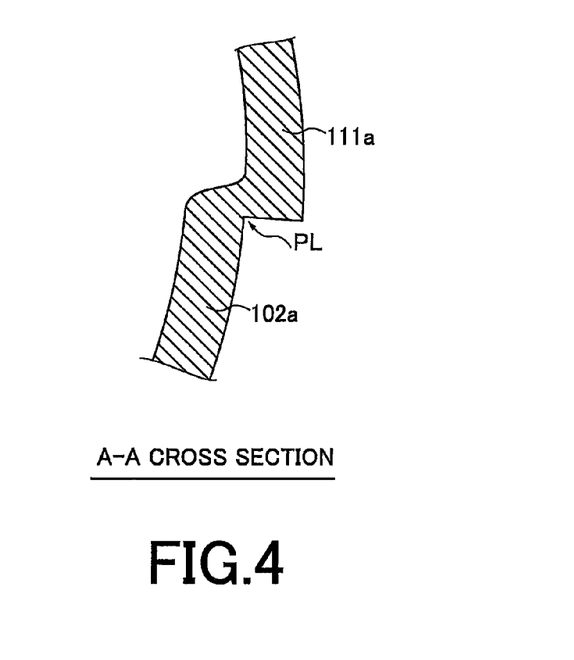
FIG. 4 is a cross-sectional view along line A-A in FIG. 3.

First, referring to FIGS. 1 to 3, a structural example of the foam duct 1 of the present embodiment will be described. FIG. 1 is a plan view of the entire foam duct 1 of the present embodiment. FIG. 2 is a partial perspective view illustrating a part of a tubular section 100a of the foam duct 1 of the present embodiment. FIG. 3 is a drawing of the tubular section 100a illustrated in FIG. 2, as seen in a direction which is parallel to the open end surface of the tubular section 100a and in which parting lines PL appears on the left and right ends on the drawing. FIG. 4 is a cross-sectional view along line A-A in FIG. 3.

The foam duct 1 of the present embodiment is a lightweight foam duct for channeling cold and hot air supplied from an air conditioning unit to a desired region. Thermoplastic resin containing a mixture of foaming agents is clamped in a divided mold and then molded by blow molding to manufacture the foam duct 1.

As illustrated in FIG. 1, the foam duct 1 includes a supply port 105 and tubular sections 100a to 100d. The supply port 105 is provided to connect the foam duct 1 to another air conditioning member (not illustrated) of the air conditioning unit. Each of the tubular sections 100a to 100d branches off from the opening of the supply port 105. The tubular sections 100a to 100d respectively include tube main bodies 101a to 101d which are flow passages for channeling cold and hot air taken from the supply port 105. The end portions of the tubular sections 100a to 100d (the end portions at the downstream side in FIG. 1) provided with fitting sections 102a to 102d and tapered sections 103a to 103d which are connected with the tube main bodies 101a to 101d, respectively. The fitting sections 102a to 102d are respectively provided in order to fit the tubular sections 100a to 100d with registers (air conditioning discharge ports) or other air conditioning members (not illustrated). The tubular sections are configured with closed-cell foam structure (volume percentage of closed cells of 70% or greater, for example) having a plurality of bubble cells with expansion ratio of 2.5 or greater, for example. The mean diameter of the bubble cells in the thickness direction of the tube main bodies is less than 300 μm for example, and preferably less than 100 μm.

The flow passages for fluid (cold and hot air for example) supplied from the supply port 105 are divided into four flow passages A, B-1, B-2, C as illustrated in FIG. 1. The foam duct 1 is configured so that the fluid from the supply port 105 flows out from the open end of the tubular section 100*a* in the flow passage A, from the open end of the tubular section 100*b* in the flow passage B-1, from the open end of the tubular section 100*c* in the flow passage B-2, and from the open end of the tubular section 100*d* in the flow passage C.

Because the tubular sections 100*a* to 100*d* all have the same or similar configuration, the tubular section 100*a* is described hereinbelow and redundant descriptions of the other tubular sections are omitted for the sake of brevity.

In order for air conditioning tubular members (not illustrated) to be easily introduced into the fitting section 102*a*, the tapered section 103*a* is formed into a tapered shape. The inner diameter of the tapered shape increases from the fitting section 102*a* toward the open end 120*a*, as illustrated in FIG. 2. The inner diameter of the fitting section 102*a* is approximately 50 to 150 mm, for example.

Focusing on the outer shape at the end portion on the downstream side of the tubular section 100*a*, the fitting section 102*a* is formed to be wider in diameter than the tube main body 101*a* connected to the opening 105, and the tapered section 103*a* is formed to be even wider in diameter than the fitting section 102*a*. Similarly, the inner diameter of the fitting section 102*a* is formed to be larger than that of the tube main body 101*a*. That is, the end portion of the tubular section 100*a* on the downstream side is formed to be in the horn shape toward the open end. The foam duct 1 of the present embodiment and other air conditioning members are thereby easily fitted together. The bottom end of the fitting section 102*a* (the location where the fitting section 102*a* and the tube main body 101*a* are connected) functions as a stopper when another air conditioning member is inserted, and the tube main body 101*a* and other air conditioning members can therefore be fitted together without any gaps.

Two parting lines PL, which is formed during molding, extends to the open end 120*a* along the direction in which the tube main body 101*a* extends, as illustrated in FIG. 2 (only single parting line PL is visible in FIG. 2). As illustrated in FIGS. 2 and 3, protruding portions 111*a*, 112*a* are formed in three locations on one side of the tubular section to either side of a parting line at least in proximity of the open end 120*a*. The protruding portions 111*a*, 112*a* are formed on one of the two parting lines, while the protruding portion 113*a* is formed on the other of the two parting lines.

The protruding portion 111*a* protrudes from the fitting section 102*a* to the tapered section 103*a*, while the protruding portions 112*a*, 113*a* protrude from the tube main body 101*a* to the fitting section 102*a*. The protruding portions 111*a* are formed into shapes so as to protrude from the parting line on one side of the parting line at least in the proximity of the open end, as illustrated in FIG. 2.

In FIG. 2, the protruding portion 111*a* protrudes from a line 1110*a* on the external peripheral surface of the fitting section 102*a*, and the protruding portion 112*a* protrudes from a line 1120*a* on the external peripheral surface of the tube main body 101*a*. In the tubular section 100*a*, the positions of the lines 1110*a* and 1120*a* may be set as appropriate on the external peripheral surfaces of the fitting section 102*a* and the tube main body 101*a*, respectively. The height of each protruding portion is approximately 1 to 5 mm, for example. The height of each protruding portion may be preferably either substantially equal to the average thickness (1 to 5 mm, for example), or slightly greater than the average thickness. That is, the height of each protruding portion may be within the range of −1 mm to +3 mm of the average thickness, for example.

The protruding portion 111*a* protrudes on one of either side of the parting line PL. Therefore, when the protruding portion is created by blow molding, a step is also formed in the internal periphery of the fitting section 102*a* in proximity to the parting line PL, as illustrated in FIG. 4. Although not illustrated in the drawings, a step is similarly formed in the internal periphery of the tube main body 101*a* in proximity to the parting line PL. This step in the internal periphery has approximately the same height as the protruding portions (that is, approximately 1 to 5 mm). The inner roundness of the fitting section 102*a* may be slightly deteriorated in proximity to the open end 120*a* due to the step in the internal periphery; however, in most cases, a flexible cushion is attached to the internal periphery of the fitting section 102*a* to fit with another air conditioning member, and the above-mentioned step of approximately 1 to 5 mm does not lead to a problem with attachment strength, flow rate loss, or the like.

The foam duct 1 of the present embodiment may be made of a polypropylene resin, and preferably a resin blend containing a mixture of 1 to 20 wt % of a polyethylene resin and/or 5 to 40 wt % of a hydrogenated styrene-based thermoplastic elastomer. The tensile fracture elongation at −10° C. of the foam duct 1 may be preferably 40% or greater, and the tensile elasticity at room temperature of the foam duct 1 may be preferably 1000 kg/cm$^2$ or greater. It is even more preferable that the tensile fracture elongation at −10° C. be preferably 100% or greater. The terms used in the present embodiment are defined hereinbelow.

Expansion ratio

The expansion ratio is the density of the thermoplastic resin used in the manufacturing method of the present embodiment described hereinafter, divided by the apparent density of a tube main body of the foam duct 1 obtained by the manufacturing method of the present embodiment.

Tensile fracture elongation

The tube main body of the foam duct 1 obtained by the manufacturing method of the present embodiment described hereinafter is cut out and stored at −10° C. Then, the tension rate of no. 2 test sample of the tube main body is measured at 50 mm/min according to JIS K-7113 to obtain a value of the tensile fracture elongation.

Tensile elasticity

The tube main body of the foam duct 1 obtained by the manufacturing method of the present embodiment described hereinafter is cut out. Then, the tension rate of no. 2 test sample of the tube main body is measured at 50 mm/min at room temperature (23° C.) according to JIS K-7113 to obtain a value of the tensile elasticity.

<Advantageous Effect of Foam Duct 1>

Next, the advantageous effect of the foam duct 1 will be described with reference to FIGS. 5A and 5B.

Figure 5A:
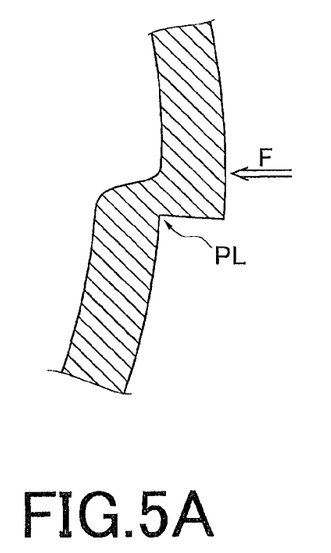
FIGS. 5A and 5B are drawings for describing the advantageous effect of the foam duct of the embodiment.
Figure 5B:
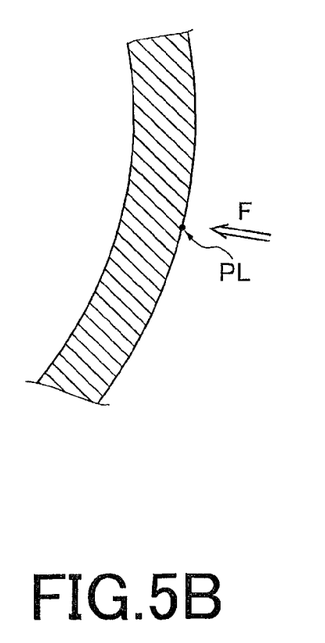

FIG. 5A is the same type of drawing as FIG. 4, except that a force F is assumed which is inputted on the proximity of the parting line PL from the side. FIG. 52 is a cross-sectional view (equivalent to FIG. 4 of the present embodiment) of a conventional foam duct wherein having no protruding portions in proximity to the parting lines PL, and similarly, a force F is assumed which is inputted on the proximity of the parting line PL from the side.

At this time, in the conventional foam duct, the force F is inputted directly on the parting line PL. As a result, in a state in which no other air conditioning member has been inserted in the fitting section of the foam duct, such as during transportation or the like, for example, there is a risk of breaks or cracks occurring from the parting line PL due to the inward-bending force acting continuously on the parting line PL. In the foam duct of the present embodiment, the force F at the proximity of the parting line PL is inputted on the protruding portion formed in the proximity of the parting line PL.

Because this protruding portion functions as a cushion ("cushion effect"), the inputted force does not likely cause breaks or cracks at the parting line PL. The "cushion effect" is particularly significant in a foam duct having expansion ratio of two or greater, and the "cushion effect" can be increased even further with a foam duct including an elastomer component (a styrene-butadiene-styrene block copolymer or the like).

<Example of Manufacturing Method of Foam Duct 1>

Figure 6:
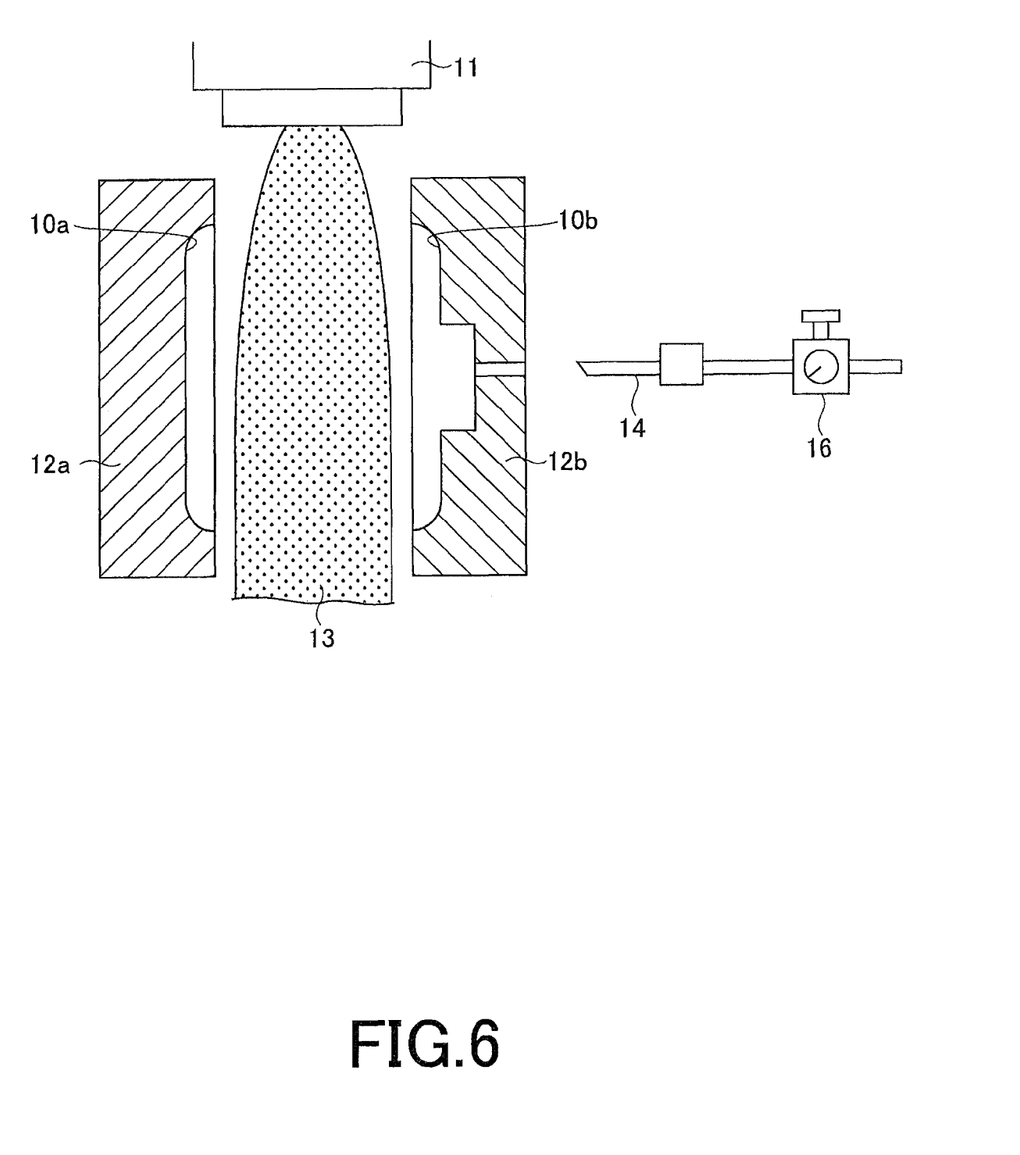
FIG. 6 is a drawing illustrating the first step in the manufacturing method.
Figure 7:
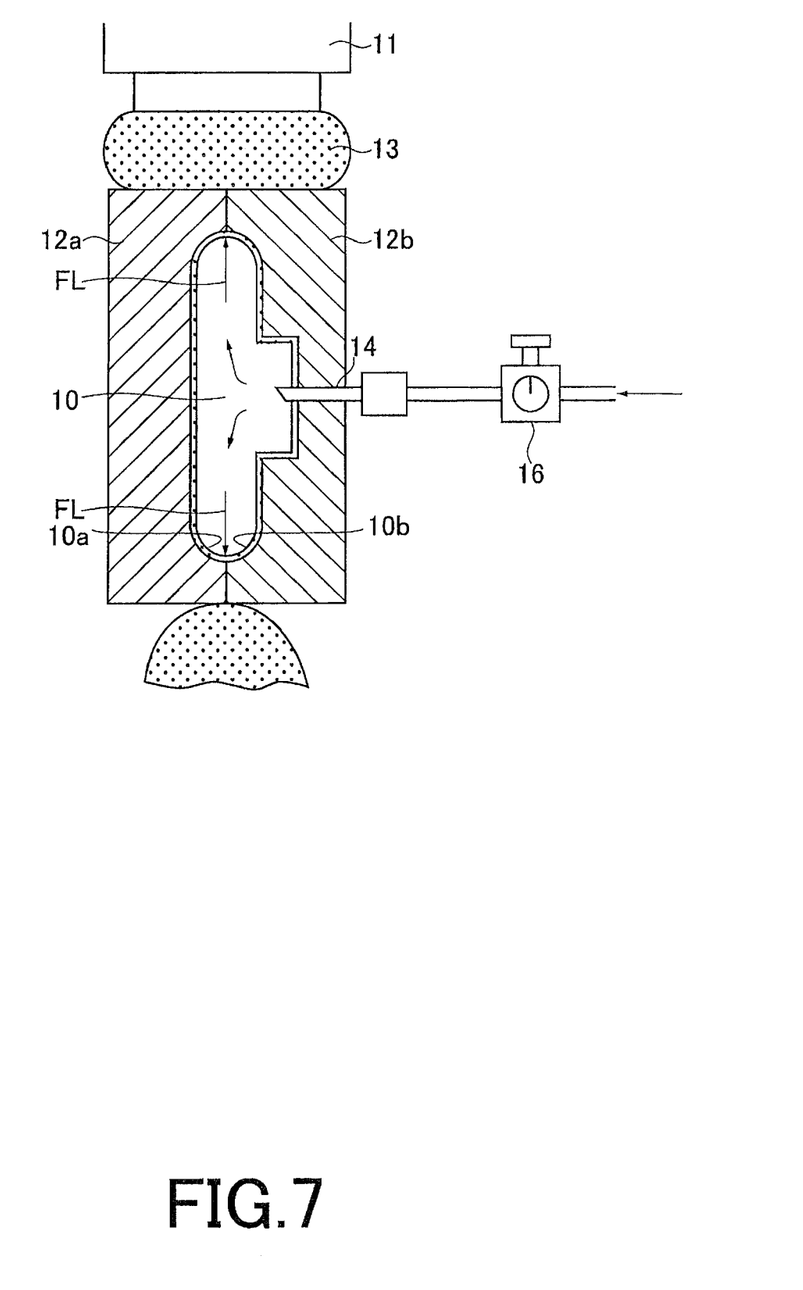
FIG. 7 is a drawing illustrating the second step in the manufacturing method from the side surface of a die.
Figure 8:
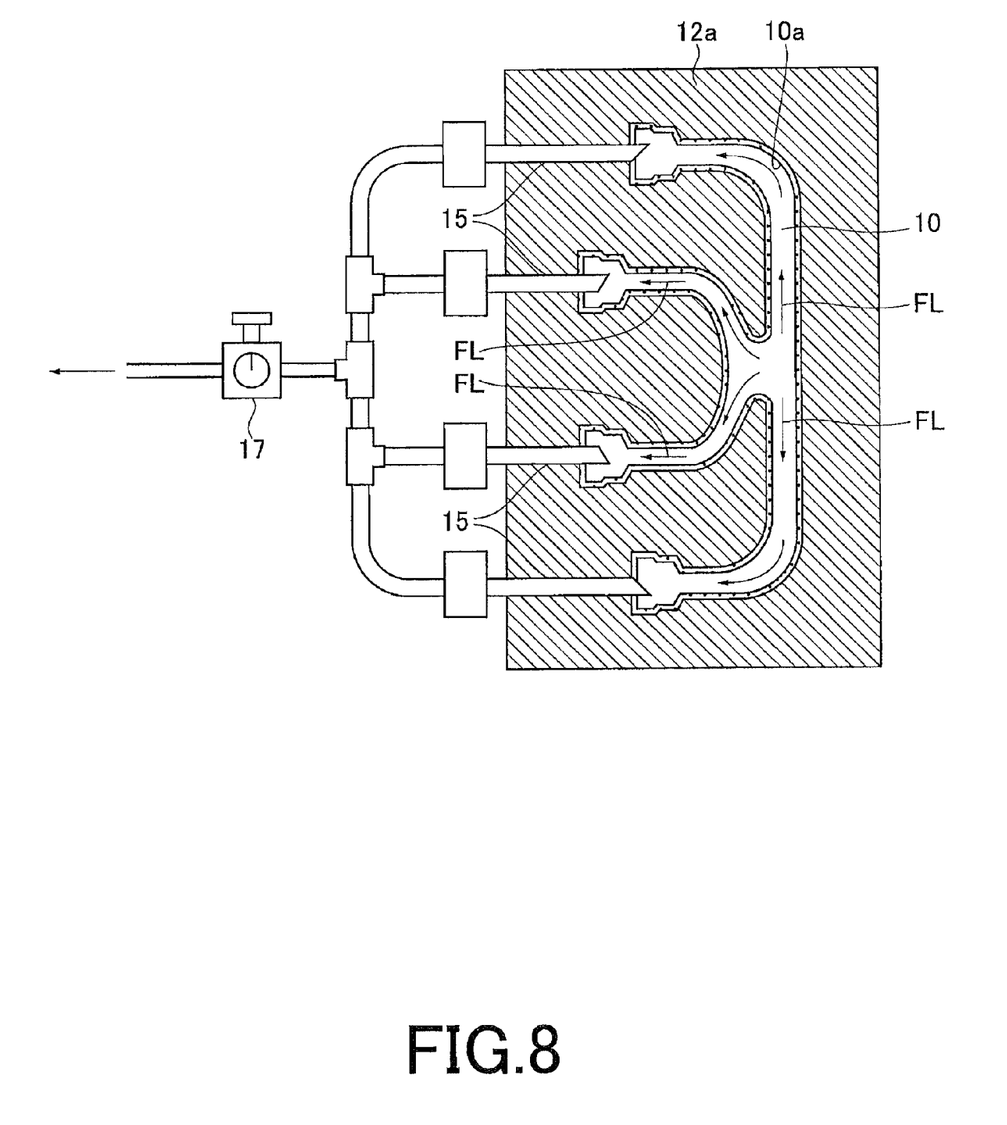
FIG. 8 is a drawing illustrating the second step in the manufacturing method from the contact surface of a divided mold.

Next, an example of the manufacturing method of the foam duct 1 of the present embodiment will be described with reference to FIGS. 6 to 8. FIG. 6 illustrates the open state of a divided mold, while FIG. 7 illustrates the closed side from the side surface of the die. FIG. 8 is a cross-sectional view illustrating of a divided mold 12a in a closed state of two divided molds, as seen from the contact surface of the die.

First, a foamed parison is extruded using an annular die 11, and a cylindrical foamed parison 13 is extruded between divided molds 12a, 12b, as illustrated in FIG. 6.

Next, the divided molds 12a, 12b are clamped together, and the foamed parison 13 is sandwiched in between the divided molds 12a, 12b as illustrated in FIG. 7. The foamed parison 13 is thereby accommodated in the cavity 10 formed with the divided molds 12a, 12b.

The shapes of the divided molds 12a, 12b are designed so that the parting lines PL are formed after molding, and that the protruding portions are formed on either of each parting line PL, as illustrated in FIGS. 2 and 3.

Next, with the divided molds 12a, 12b clamped together as illustrated in FIGS. 7 and 8, a blow-in nozzle 14 and blow-out nozzles 15 are passed through predetermined holes formed in the divided molds 12a, 12b, and these nozzles simultaneously penetrate into the foamed parison 13. When the tips of the blow-in nozzle 14 and the blow-out nozzles 15 enter the foamed parison 13, compressed gas such as air is immediately blown into the foamed parison 13 from the blow-in nozzle 14, and is then blown out from the blow-out nozzles 15 via the interior of the foamed parison 13. This blow molding is performed at a predetermined blow pressure.

The blow-in nozzle 14 penetrates at a position equivalent to the opening of the supply port 105 of the foam duct 1 illustrated in FIG. 1, forming a blow-in hole for blowing a compressed gas into the interior of the foamed parison 13. The blow-out nozzles 15 penetrates at positions equivalent to the respective open ends of the tubular sections 100a to 100d of the foam duct 1 illustrated in FIG. 1, forming blow-out holes for blowing the compressed gas out of the interior of the foamed parison 13.

The compressed gas is thereby blown into the interior of the foamed parison 13 from the blow-in nozzle 14, and is then blown out from the blow-out nozzles 15 via the interior of the foamed parison 13. This blow molding can be performed with a predetermined blow pressure.

The blow-in nozzle 14 penetrates through the opening of the supply port 105 of the foam duct 1 as described above, and the blow-in nozzle 14 is therefore inserted into the divided mold 12b from the side of the divided mold 12b that is opposite the divided mold 12a as illustrated in FIG. 7.

The blow-out nozzles 15 penetrates through the respective open ends of the tubular sections 100a to 100d of the foam duct 1 as described above, and the blow-out nozzles 15 are therefore inserted into the divided molds 12a, 12b from the contact surfaces of the divided molds 12a, 12b as illustrated in FIG. 8.

The blow pressure is the differential pressure of a regulator 16 and a back-pressure regulator 17. Each of the regulator 16 and the back-pressure regulator 17 is set to a predetermined pressure with the divided molds 12a, 12b in a hermetically closed state, and blow molding is performed with a predetermined blow pressure. For example, a compressed gas of a predetermined pressure is blown into the foamed parison 13 from the blow-in nozzle 14 for a predetermined amount of time, and the pressure inside the foamed parison 13 (the internal pressure) is increased from atmospheric pressure to a predetermined pressure.

The blow pressure is set to 0.5 to 3.0 kg/cm$^2$, and is preferably set to 0.5 to 1.0 kg/cm$^2$. When the blow pressure is set to 3.0 kg/cm$^2$ or greater, the thickness of the tube main body of the foam duct 1 may be readily decreased, and the expansion ratio may readily decrease. When the blow pressure is set to 0.5 kg/cm$^2$ or less, it becomes difficult to adjust the differential pressure of the regulator 16 and back-pressure regulator 17, or it becomes difficult for the surface shape of a ventilation passage inside the foam duct 1 to be deformed along the flow passage direction FL of compressed gas blown into the foamed parison 13. Therefore, the blow pressure is set to 0.5 to 3.0 kg/cm$^2$, and is preferably set to 0.5 to 1.0 kg/cm$^2$.

When blow molding is performed with a predetermined blow pressure, temperature adjusting equipment may be provided, and the compressed gas supplied into the foamed parison 13 from the blow-in nozzle 14 may be heated to a predetermined temperature. The compressed gas supplied into the foamed parison 13 thereby reaches the predetermined temperature, and the foaming agent included in the foamed parison 13 can therefore be foamed more easily. The predetermined temperature is preferably set to a temperature suitable for foaming the foaming agent.

Another possibility is to supply the compressed gas from the blow-in nozzle 14 into the foamed parison 13 at room temperature without temperature adjusting equipment provided. In this case, because there is no need to provide temperature adjusting equipment for adjusting the temperature of the compressed gas, the foam duct 1 can be manufactured at a lower cost. Further, because blow molding is performed at room temperature, the amount of time spent cooling the foam duct 1 is shortened after blow molding.

In the present embodiment, a compressed gas is blown into the foamed parison 13 from the blow-in nozzle 14, and the gas is vented from the cavity 10 of the divided molds 12a, 12b. Therefore, gaps between the foamed parison 13 and the cavity surfaces 10a, 10b are eliminated, and a state of negative pressure is produced inside the cavity 10. A pressure difference is thereby created between the interior and exterior of the foamed parison 13 (the interior of the foamed parison 13 has a higher pressure than the exterior) accommodated in the cavity 10 inside the divided molds 12a, 12b, and the foamed parison 13 is pushed against the cavity surfaces 10a, 10b. Thus, a foam duct 1 is molded which has a passage for fluid on the inner side of the tube main body.

In the manufacturing steps described above, the step of blowing a compressed gas into the foamed parison 13 and the step of creating negative pressure outside of the foamed parison 13 need not be performed simultaneously, and these steps may be sequentially performed. A foam duct 1 having a passage for fluid on the inner side of the tube main body can be molded by performing only one of either of these steps in order for the foamed parison 13 to be pushed against the cavity surfaces 10a, 10b of the divided molds 12a, 12b.

With regard to the portion of the foamed parison 13 that will become the tube main body, the compressed gas such as air has been blown into the foamed parison 13 from the blow-in nozzle 14 as described above, and the compressed gas has been blown out from the blow-out nozzles 15 via the interior of the foamed parison 13. Then, the foamed parison is pushed against the cavity surfaces 10a, 10b at the predetermined blow pressure, and the inner sides of the foamed parison 13 are cooled at the predetermined blow pressure.

The temperature of the compressed gas supplied from the blow-in nozzle 14 in order to cool the interior of the foamed parison 13 is set to 10° C. to 30° C., and is preferably set to room temperature (e.g. 23° C.). Due to the temperature of the compressed gas being set to room temperature, there is no need to provide a temperature adjusting equipment for adjusting the temperature of the compressed gas. Thus, the foam duct 1 can therefore be manufactured at a lower cost. When temperature adjusting equipment is provided and the temperature of the compressed gas supplied from the blow-in nozzle 14 into the foamed parison 13 is lowered below room temperature, the amount of time for cooling the foam duct 1 can be shortened. Depending on the temperature of the compressed gas, the cooling time is preferably 30 to 80 seconds.

With the molding method described above, a tube main body can be molded having a passage for fluid inside whose surfaces are smoothly formed.

A foam duct 1 can be manufactured having a ventilation passage through which fluid flows more easily in the flow passage direction FL than in the opposite direction of the flow passage. Because this flow passage direction FL is the same direction in which fluid is channeled in the flow passages A, B-1, B-2, C of the foam duct 1, a foam duct 1 can be manufactured in which fluid flows easily in the direction in which fluid is channeled in the flow passages.

After the foam duct 1 has been sufficiently cooled, the molds are opened and the foam duct 1 is taken out. At this time, in cases in which the direction in which the divided molds 12a, 12b are opened is not a perpendicular direction to the surfaces formed by the two parting lines in proximity to the open ends formed in the tubular sections of the foam duct 1, but is instead slightly inclined from the perpendicular direction, hollow portions in the divided molds are designed which corresponds to the protruding portions in the proximity of the open ends. Therefore, the molded product is easily extracted (taken out) from the molds.

The polypropylene resin, which may be applied when the foam duct 1 of the present embodiment is molded, is preferably polypropylene having a melt tension at 230° C. within the range of 30 to 350 mN. Particularly, the polypropylene resin is preferably a propylene homopolymer having a long-chain branched structure, preferably with addition of an ethylene-propylene block copolymer.

Weight percent (wt %) of the hydrogenated styrene thermoplastic elastomer blended to the polypropylene resin may be 5 to 40 wt %, or more preferably, 15 to 30 wt % in order to improve impact resistance and maintain the rigidity of the foam duct 1.

More specifically, a styrene-butadiene-styrene block copolymer, a styrene-isoprene-styrene block copolymer, a styrene-butadiene random copolymer, or another hydrogenated polymer may be applied. The applied hydrogenated styrene thermoplastic elastomer may preferably include a styrene content of less than 30 wt % or preferably less than 20 wt %, and its MFR (melt mass-flow rate) at 230° C. (measured according to JIS K-7210 at a testing temperature of 230° C. and a testing load of 2.16 kg) may be 10 g/(10 min) or less, or preferably 5.0 g/(10 min or less) and 1.0 g/(10 min or greater).

The polyolefin polymer blended into the polypropylene resin is preferably low-density ethylene-α-olefin, and is preferably added in the range of 1 to 20 wt %. The low-density ethylene-α-olefin used preferably has a density of 0.91 g/cm$^3$ or less. A preferred example is an ethylene-α-olefin copolymer obtained by copolymerization of ethylene and $C_{3\text{-}20}$ α-olefin, examples of which include propylene, 1-butene, 1-pentene, 1-hexene, 1-heptene, 1-octene, 1-nonene, 1-decene, 1-dodecene, 4-methyl-1-heptene, 4-methyl-1-hexene, and the like. Among them, 1-butene, 1-hexene, 1-octene, and the like are particularly preferred. Any single material of the $C_{3\text{-}20}$ α-olefin may be used alone, or two or greater numbers of material of the $C_{3\text{-}20}$ α-olefin may be used together. The amount of monomer units based on the ethylene in the ethylene-α-olefin copolymer is preferably within the range of 50 to 99 wt % of the ethylene-α-olefin copolymer. The amount of monomer units based on the α-olefin is preferably within the range of 1 to 50 wt % of the ethylene-α-olefin copolymer. Particularly, it is preferable to use a straight-chain ultralow-density polyethylene or ethylene elastomer, or a propylene elastomer that is polymerized using a metallocene catalyst.

Examples of the foaming agent that may be applied when molding the foam duct 1 of the present embodiment include physical foaming agents, chemical foaming agents, and mixtures thereof. Air, carbon gas, nitrogen gas, water, and other inorganic physical foaming agents; butane, pentane, hexane, dichloromethane, dichloroethane, and other organic physical foaming agents; and supercritical fluids thereof, may be applied as a physical foaming agent. The supercritical fluid is preferably made using carbon dioxide, nitrogen, or the like; if nitrogen is used, the fluid may be made under supercritical temperature of −149.1° C. and a supercritical pressure of 3.4 MPa or greater. When carbon dioxide is used, the fluid may be made under supercritical temperature of 31° C. and a supercritical pressure of 7.4 MPa or greater.

[Other Examples of the Manufacturing Method]

Next, other methods for manufacturing the foam duct 1 as the embodiment described above will be described with reference to FIG. 9.

Figure 9:
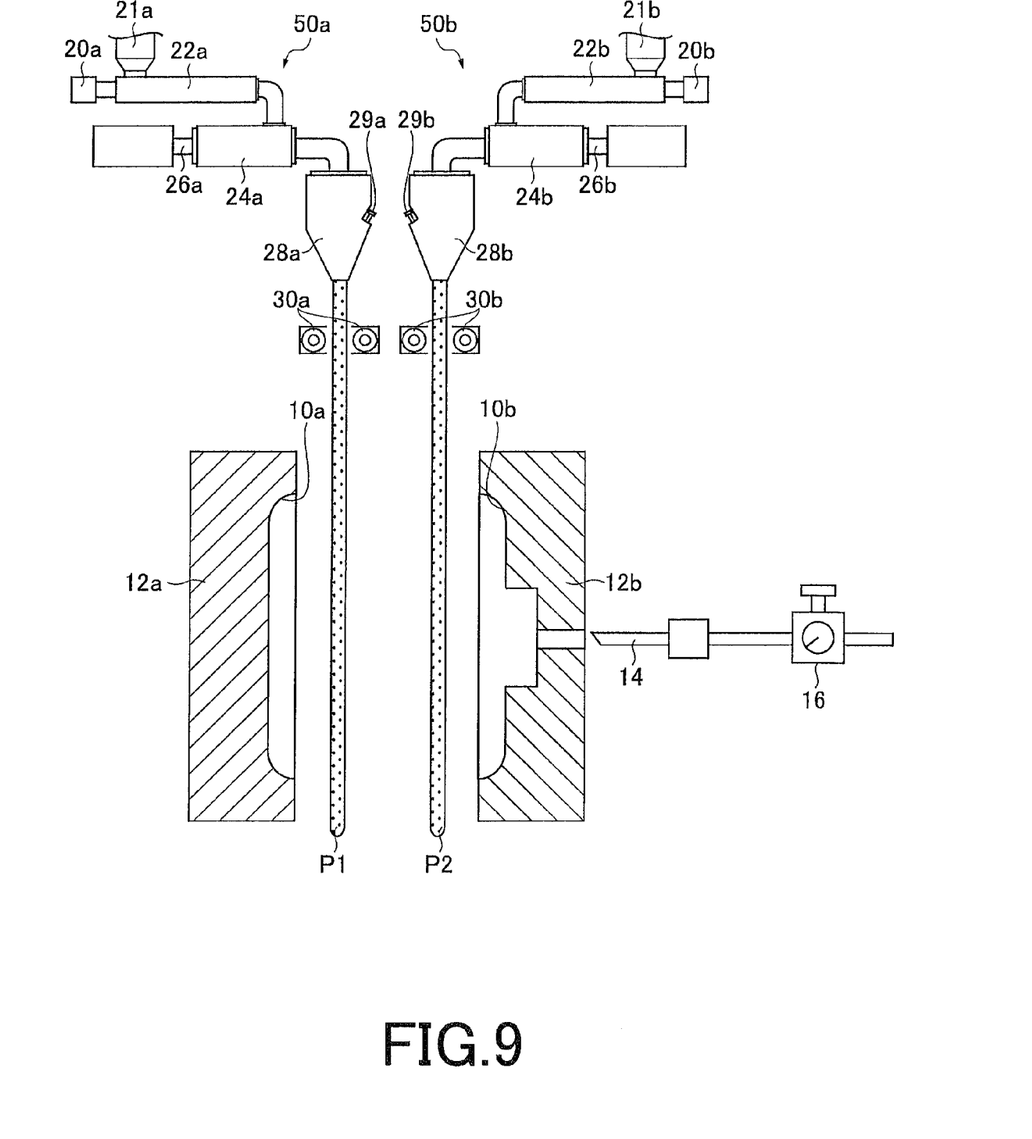
FIG. 9 is a drawing illustrating an example of another manufacturing method.

In another manufacturing method described herein, instead of molding by extruding the cylindrical foamed parison 13 between the divided molds 12a, 12b with the above-described manufacturing method, molding is performed by extruding a sheet-shaped melted resin between the divided molds 12a, 12b as illustrated in FIG. 9.

A molding system used in the other manufacturing method is configured to have two extrusion apparatuses 50a, 50b and the same divided molds 12a, 12b as those of the above-described manufacturing method example, as illustrated in FIG. 9.

The extrusion apparatuses 50 (50a, 50b) are disposed so that melted resin sheets P1, P2, which are made of a foaming resin in a melted state and which are of the same material as the foamed parison 13 in the above-described manufacturing method example, are vertically suspended substantially parallel at predetermined gaps between the divided molds 12a, 12b. Adjusting rollers 30a, 30b are disposed below T dies 28a, 28b for extruding the melted resin sheets P1, P2, and thickness and other characteristics are adjusted by the adjusting rollers 30a, 30b. The melted resin sheets P1, P2 extruded in this manner are clamped between the divided molds 12a, 12b and molded.

Because the two extrusion apparatuses 50 (50a, 50b) have the same configuration, one extrusion apparatus 50 is only described with reference to FIG. 9 for the sake of brevity.

The extrusion apparatus 50 is configured to have a cylinder 22 in which a hopper 21 is installed, a screw (not illustrated) provided within the cylinder 22, a hydraulic motor 20 connected to the screw, an accumulator 24 connected internally with the cylinder 22, a plunger 26 provided within the accumulator 24, a T die 28, and a pair of adjusting rollers 30.

Resin pellets entering from the hopper 21 are melted and mixed within the cylinder 22 by the rotation of the screw caused by the hydraulic motor 20. Then, the resin in a melted state is transferred to the accumulator 24, and a certain amount of the melted resin is stored. The melted resin is then sent to the T die 28 by the driving of the plunger 26. Thus, a continuous melted resin sheet made of the resin in a melted state is extruded from the extrusion slit in the lower end of the T die 28, the sheet proceeds downward while being pressed between the pair of adjusting rollers 30 disposed at a gap from each other, and the sheet is vertically suspended between the divided molds 12*a*, 12*b*.

A die bolt 29 for adjusting the slit gap of the extrusion slit is provided to the T die 28. The mechanism for adjusting the slit gap may include various conventionally known adjustment mechanisms in addition to the machine-type mechanism utilizing the die bolt 29.

With such a configuration, the melted resin sheets P1, P2 having bubble cells inside are extruded from the extrusion slits of the two T dies 28*a*, 28*b*, adjusted to a state having a uniform thickness in the direction of extrusion, and vertically suspended between the divided molds 12*a*, 12*b*.

When the melted resin sheets P1, P2 are disposed between the divided molds 12*a*, 12*b* in this manner, the divided molds 12*a*, 12*b* are advanced horizontally forward, and moldings (not illustrated) positioned on the external peripheries of the divided molds 12*a*, 12*b* are adhered to the melted resin sheets P1, P2. After the melted resin sheets P1, P2 have been held by the moldings on the external peripheries of the divided molds 12*a*, 12*b* in this manner, the melted resin sheets P1, P2 are pulled by vacuum suction into the cavity surfaces 10*a*, 10*b* of the divided molds 12*a*, 12*b*. Accordingly, the melted resin sheets P1, P2 becomes shapes identical to the cavity surfaces 10*a*, 10*b*.

Next, the divided molds 12*a*, 12*b* are further advanced horizontally forward and clamped together, and similar to the manufacturing method described above, the blow-in nozzle 14 and the blow-out nozzles 15 penetrates the melted resin sheets P1, P2. Then, compressed gas such as air is blown into the melted resin sheets P1, P2 from the blow-in nozzle 14, and the compressed gas is blown out from the blow-out nozzles 15 via the interiors of the melted resin sheets P1, P2. Thus, the inner side of the portion that will become the tube main body of the foam duct 1 is cooled.

Next, the divided molds 12*a*, 12*b* are horizontally retracted, and the foam duct 1 is taken out of the divided molds 12*a*, 12*b*.

In order to reduce deviation in thickness due to the sheets being drawn down or their necks being pulled in, the melted resin sheets P1, P2 vertically suspended between the pair of divided molds 12*a*, 12*b* may be individually adjusted in terms of resin sheet thickness, extrusion speed, thickness distribution in the extrusion direction, and other characteristics.

Various conventionally known methods may be applied to adjust the resin sheet thickness, extrusion speed, thickness distribution in the extrusion direction, and other characteristics.

As described above, the foam duct 1 in the present embodiment may be manufactured in a suitable manner with the other manufacturing method example illustrated in FIG. 9 as well, similar to the above-described manufacturing method in FIGS. 6 to 8. In the other manufacturing method example illustrated in FIG. 9, foam ducts 1 adapted to various conditions or characteristics may be molded by applying different materials, expansion ratios, thicknesses, and other characteristics in the two melted resin sheets P1, P2. Even in the case of having a large stepped shape in the internal peripheral sides of the duct open ends, there are no problems with attachment strength, flow rate loss, or the like, when the duct is fitted with an air conditioning tubular member having a shape corresponding to the stepped shape of the duct open ends.

All examples and conditional language used herein are intended for explanatory purposes to aid the readers in understanding the invention and the concepts contributed by the inventor to furthering the art, and are not to be construed as limiting the scope of the invention to such specifically described examples and conditions, nor does the organization of such examples in the specification relate to a showing of the superiority and inferiority of the invention. Although the embodiment(s) of the present invention have been described in detail, it should be understood that various changes, substitutions, and alternations could be made hereto without departing from the spirit and scope of the invention.

The foam duct according to the present invention may be used in various applications, such as air conditioning ducts in automobiles, trains, ships, aircraft, and other transport vehicles, for example.

What is claimed is:

1. A molded foam comprising
a tubular section having an open end, with a parting line formed along an external peripheral surface of the tubular section at an intersection between two molds during blow molding, the parting line extending from proximate the open end and along the external surface of the tubular section, the external surface having a protruding portion protruding from the external surface at one side of the parting line at least in the proximity of the open end.

2. The molded foam according to claim 1, wherein the tubular section has a shape in which a diameter of the tubular section increases toward the open end.

* * * * *